3 Sheets—Sheet 1.

H. L. RUSSELL,

Assignor, by mesne assignments, to THE RUSSELL INDICATOR LOCK CO.

Indicator Lock.

No. 9,300. Reissued July 13, 1880.

Witnesses:
Fred. G. Dieterich
P. C. Dieterich.

Inventor:
H. L. Russell
per. De Witt C. Allen
attorney

3 Sheets—Sheet 2.

H. L. RUSSELL,

Assignor, by mesne assignments, to THE RUSSELL INDICATOR LOCK CO.

Indicator Lock.

No. 9,300. Reissued July 13, 1880.

Witnesses:
Fred J. Dieterich
P. C. Dieterich

Inventor:
H. L. Russell
per DeWitt C. Allen
atty

3 Sheets—Sheet 3.
H. L. RUSSELL,
Assignor, by mesne assignments, to THE RUSSELL INDICATOR LOCK CO.
Indicator Lock.
No. 9,300. Reissued July 13, 1880.
Fig. 7.
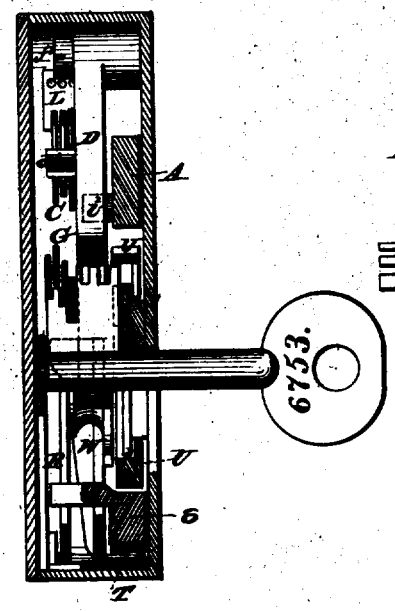
Fig. 9.
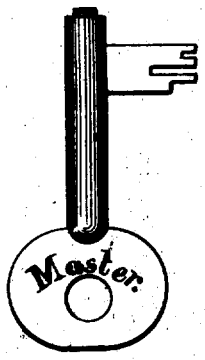
Fig. 10.
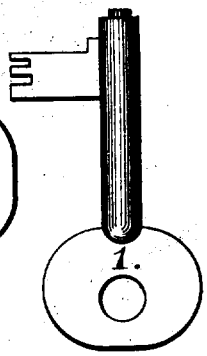
Fig. 8.
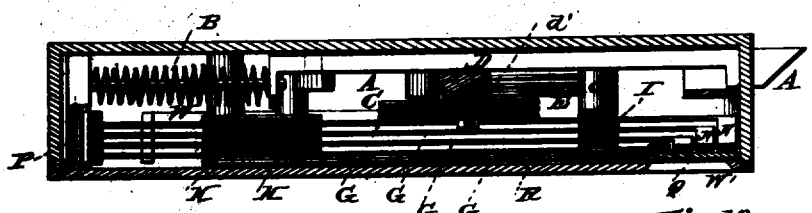
Fig. 11.
Fig. 12.
Fig. 13.
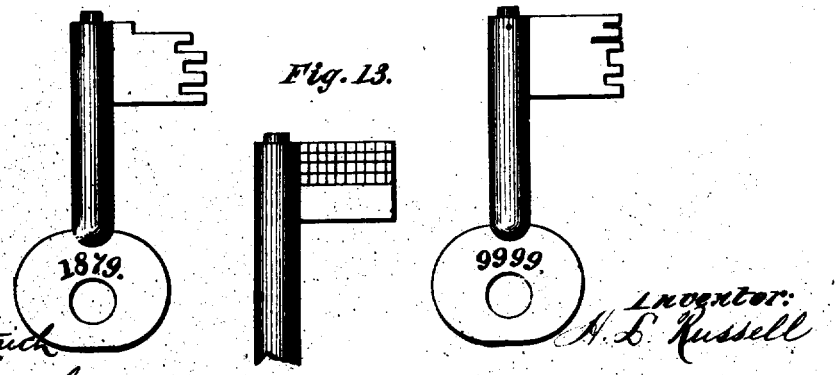
Witnesses:
Fred. J. Dieterich
P. C. Dieterich
Inventor:
H. L. Russell
per Dr Will C. Allen
atty

UNITED STATES PATENT OFFICE.

HENRY L. RUSSELL, OF BLOOMINGTON, ILLINOIS, ASSIGNOR, BY MESNE ASSIGNMENTS, TO THE RUSSELL INDICATOR LOCK COMPANY, OF SAME PLACE.

INDICATOR-LOCK.

SPECIFICATION forming part of Reissued Letters Patent No. 9,300, dated July 13, 1880.

Original No. 223,955, dated January 27, 1880. Application for reissue filed May 24, 1880.

*To all whom it may concern:*

Be it known that I, HENRY LEWIS RUSSELL, of Bloomington, in the county of McLean and state of Illinois, have invented certain new and useful Improvements in Indicator-Locks; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

The object of my invention is to provide a lock especially designed for fire-alarm boxes, railroad-switches, &c., where it may sometimes be desirable to know who unlocked it last, that must be opened with numbered keys, and will register the number of the key that last unlocked it; and to this end the invention consists, essentially, in the combination, with the locking mechanism of a lock, of registering mechanism for registering or indicating any one of a series of differently formed and indicated keys, which operates both the locking and registering mechanism in unlocking the lock.

It further consists in certain novel combinations of devices and in peculiar constructions of parts, which will hereinafter specifically be designated.

Figure 1:
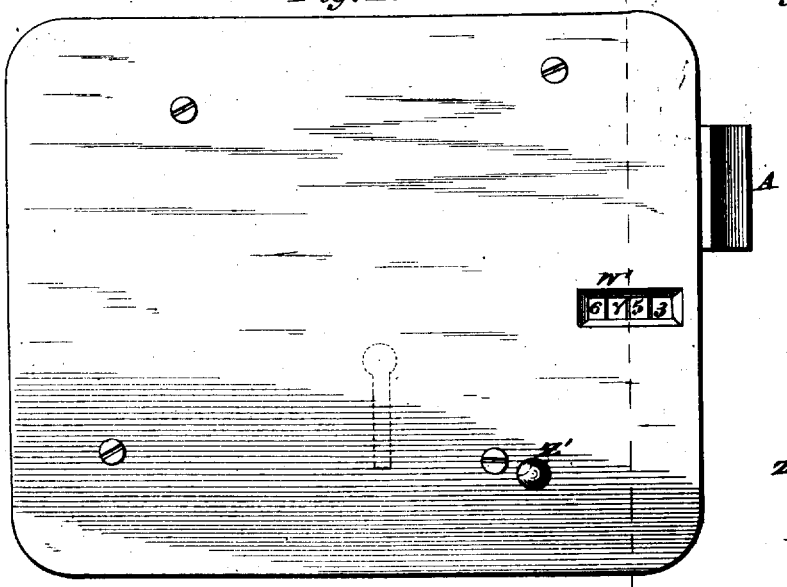
Figure 2:
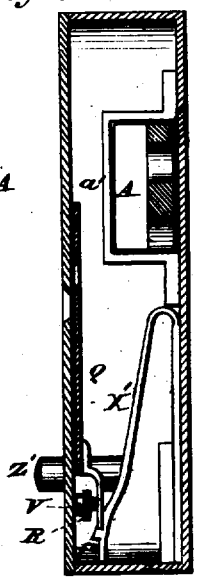
Figure 3:
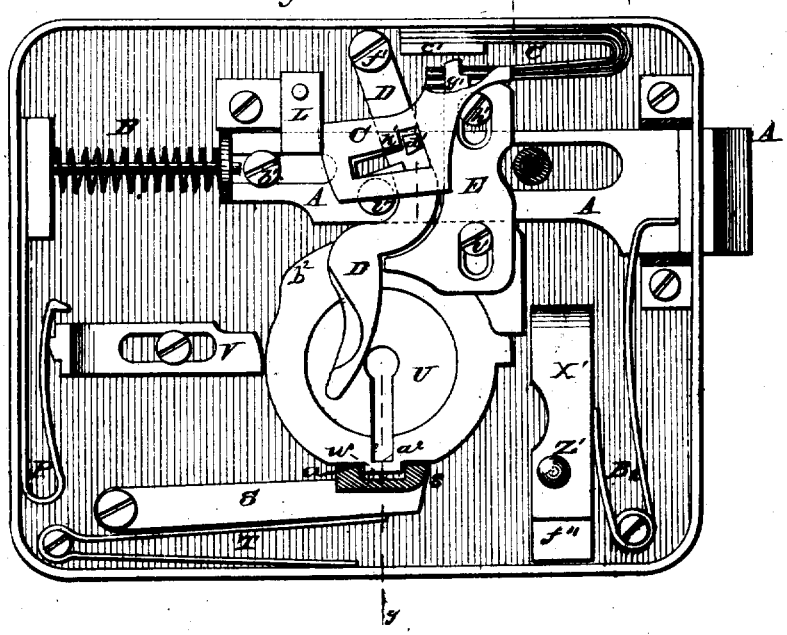
Figure 4:
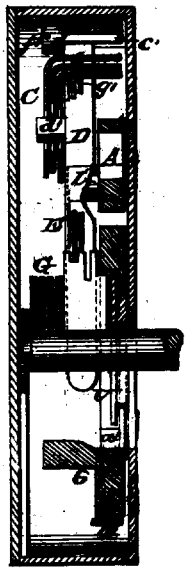
Figure 5:
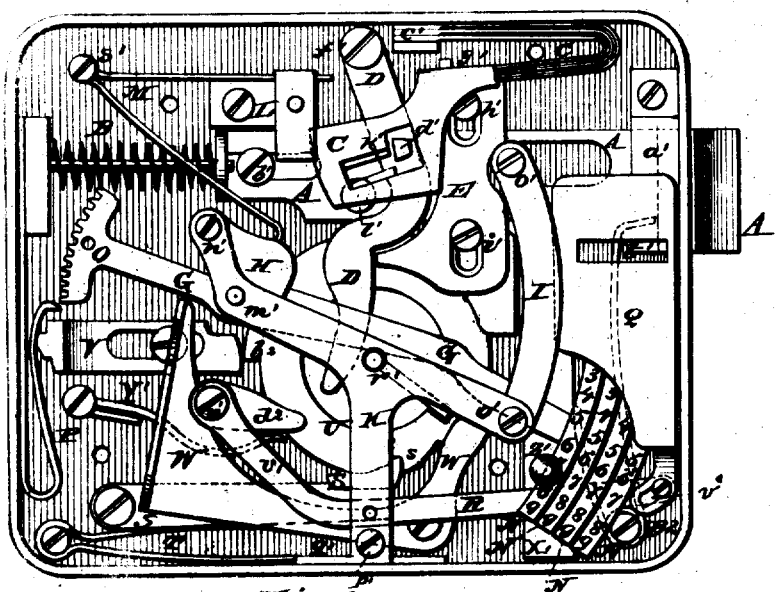
Figure 6:
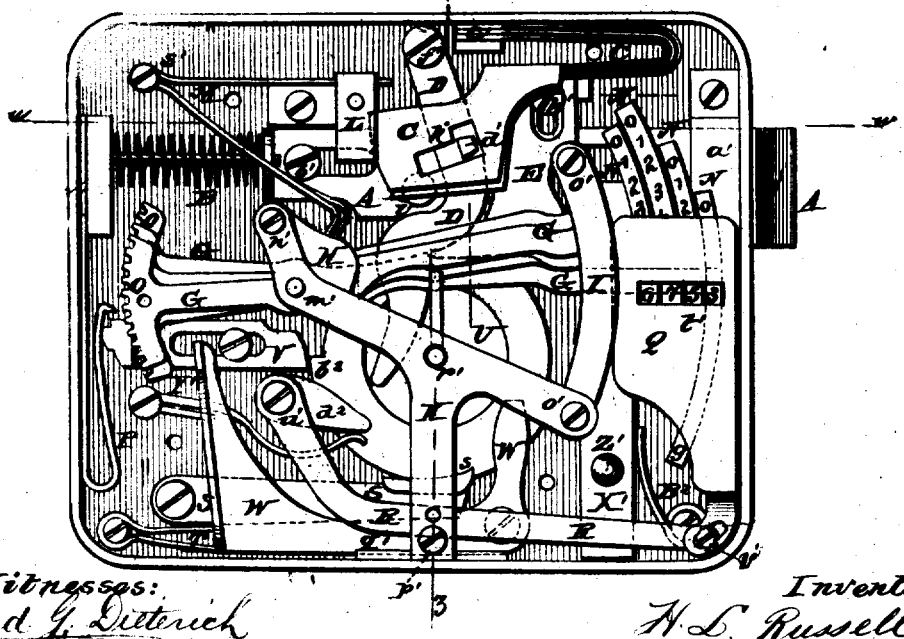

Referring to the accompanying drawings, Figure 1 represents a plan of the lock; Fig. 2, a sectional elevation on line *x x* of Fig. 1; Fig. 3, a plan of the lock with the back of the case and the registering tumblers or tablets, &c., removed; Fig. 4, a sectional elevation on line *y y*, Fig. 3; Fig. 5, a plan of the inside of the lock; Fig. 6, a plan of the inside of the lock, showing the position of the parts of the mechanism when registering No. 6753; Fig. 7, a section elevation on line *z z*, Fig. 6; Fig. 8, a horizontal section on line W W, Fig. 6. Fig. 9 represents the master-key. Fig. 10 represents key No. 1. Fig. 11 represents key No. 1879. Fig. 12 represents key No. 9999. Fig. 13 represents a key-blank marked to indicate the system of construction.

The lock is provided with the usual bolt A, which is held in its horizontal plane by the yoke *a'* and pin *b'*, and is thrown and held out by the spiral spring B and bent springs $B^2$. It is also provided with three spring-tumblers, C, that are secured at *c'* to the inside of the rim of the case, whose free slotted ends set over the boss *d'*, which projects upward from the lever D, that is pivoted at *f'*, and with three slides, E, that are held in place over the bolt A, with their pointed upper ends, *g'*, engaging in corresponding holes in the tumblers C by the pins *h'* and *i*, that pass through their slots and are secured in the front plate of the lock. When a key is inserted in the lock and turned it will come in contact with the lower edge of one or more of these slides E, and cause it or them to move the tumblers to release the boss *d'* from the shoulder or shoulders *k'*, and hold them there until the key, in its further turning, is brought against the lever D, which engages with the stud *l'* on the bolt A, and presses it back until the bolt is drawn in. Then the key slips past the end of the lever D, when the action of the spiral spring B restores the parts to their original position.

Though the effects produced by the action of the above-described parts resemble those of corresponding parts in other locks, it will be seen that there is much novelty both in construction and arrangement of the tumblers, slides, and lever, and this construction and arrangement make easy the construction and arrangement and the accurate working of the registering mechanism of the lock.

The registering arrangement is composed of four levers, G, placed side by side and pivoted on the pin *m'*, and they are kept from interfering with each other, and their swing or movement is limited by the two sets of plates H and I, within which they play, and which are secured to the front plate of the lock by the screws *n'* and *o'*. Secured also on screws *n'* and *o'*, and by screw *p'* to the lug *q'* on the inside of the rim of the case of the lock, is a plate, K, provided with a central socket, *r'*, in which a key pivots when turned in the lock; or when a pipe or barrel key is used a pin will be substituted for the socket; or the plate K may be altogether dispensed with and the pin or socket located in the back of the lock.

The rectangular block L, which is firmly secured to the front plate of the lock-case, is provided with four holes for the reception of the ends of the springs M, that are bent around the stud $s'$, and thence directed between the plates H against the levers G, to assist in operating them. To one end of the levers G are attached the parallel segmental tablets N, on which are inscribed a cipher and the nine digits, and the other ends of the levers G are broadened into curved ratchets O, in which engages the spring-pawl P, each ratchet being provided with as many teeth as there are numbers on the corresponding tablets. A sliding or movable plate, Q, provided with an aperture, $t'$, that crosses the tablets N at about a right angle, covers or nearly covers the tablets, and said slide is operated by the lever R, that is held on the pin $w'$, and connected with the said plate by means of the pin $i$, that plays in a slot in the end of the plate. The lever R, for moving the plate Q, is operated through the medium of a master-key, which is used for opening the lock, and which will move the lever R so as to bring the aperture $t'$ in said plate under a corresponding aperture, W', in the lock, and thus expose to view the numbers or figures registered each time a key has been used for opening or operating the lock.

The lock herein shown will register all numbers from 0001 to 9999, and for each number in this range there is provided a separate key, whose application to the lock will invariably register a certain combination of numbers and none other, and each key will have stamped upon it the number of the combination it will register, and, in addition, is a key called the "master-key," that does not change the register. Once applied to the lock and turned so as to pass the lever S, no key save the master-key can be withdrawn until it has been turned completely around and has moved the tablets to register its number under the aperture in the back plate of the lock, while the master-key alone can move the plate Q to open the register, as will be hereinafter explained.

In operating the lock, a key is introduced into the key-hole and socket $r'$, pressing down the lever S against the pressure of the spring T as it enters, so as to disengage it from the revolving ring U, and at the same time engaging in the slot $a^2$ in the edge of the ring. As the ring revolves to the right with the key the spring-lever S bears against the periphery of the ring, so that it is impossible to turn the ring with the key backward to remove the key, as the projecting shoulder $a$ of the ring will engage the shoulder $s$ of the spring-lever S, thus preventing its being turned farther backward to remove the key. As the ring revolves farther to the right with the key its eccentric edge $b^2$ presses against the slide V, and, forcing it against the spring-pawl P, causes the pawl to release the ratchet ends O of the levers G. Still turning, the key then strikes one end of the lever W and throws the other end up against the levers G, to bring them all parallel with each other, as shown in Fig. 5. Still turning, the key then releases the lever W, which falls back to its first position, and the key then comes in contact with the edges of one or more of the levers G, and moves them so that their combined tablets shall register, immediately under the aperture W' in the back of the lock, the number corresponding with that imprinted on the key, while almost simultaneously therewith the eccentric rim $b^2$ of the revolving ring U releases the slide V, which permits the spring-pawl P to re-engage with the ratchet or ratchets O and hold the levers G, and thereby the tumblers or tablets, in place as registered. At the same time the key is in contact with the slides E and is causing them to operate upon the spring-tumblers C to make them release the lever D, by whose means the bolt is drawn back. Then the key comes in contact with lever D and, continuing its movement, forces back the lever D and bolt until the lock is unlocked, and then, still turning, it releases the lever and permits the bolt to be thrown out again by the action of the spiral spring B and bent springs $B^2$. The key being then turned farther around to the key-hole is removed, when the spring-lever S will engage with the lug $w$ of revolving ring U, thus locking it in position.

The master-key, when put in the lock and turned, does not carry around with it the revolving ring U, but simply draws back and then releases the bolt A, until it comes in contact with the lower arm, $d^2$, of the lever R, which it presses down until the lever draws down the attached slide or plate Q, so that the aperture through it is brought directly under the aperture W' in the lock-case, thus opening the register, and at this point the said lever R is caught and held by the shoulder $f''$ in the bent spring X'. Pressure down upon the stud Z' will force the spring down at any time and release the lever R, when the spring Y', that bears against the arm $d^2$, will cause it to force the lever R, with the plate Q, upward, and thus close the register or aperture W'.

It will thus be observed that none of the keys except the master-key operates the slide or plate Q; consequently the aperture W' in lock-case is at all times closed, except when the master-key is used for operating the lock, which will then bring the aperture in said plate Q over the aperture in lock-case, thus permitting the person having the master-key to observe the number of the key registered that was last used in opening the lock.

The addition of another lever G and registering-tablet would make one hundred thousand combinations of numbers; but so large a number of keys would hardly be required for one lock.

I do not confine myself to the precise form of registering-tablets herein shown, nor to the exact form of the levers G, for in a padlock, for instance, the tablets will be thick enough to receive the numbers on the faces instead of on the sides, and the numbers will be seen through a slit or aperture in the bottom edge of the lock-case. There would also be a flange turned upon the concave face of the tablet, and the ratchets cut therein.

Other modifications may be made in applying the device to other styles of locks without departing from my invention.

In the master of the keys, that part of the blank nearest the hand operates the ring U and the locking mechanism of the bolt, which may be of any desired construction, while the other parts of the key operate the registering mechanism.

Fig. 13 shows a key-blank marked with four rows of nine squares each, to correspond respectively with the number of levers and the numbers on the tablets.

The blank, it will be seen, can be cut away to make the key avoid one or the other or all of the levers, or points may be left to press upon one or all of the levers, and of such length as to press them, or any of them, to the full or partial extent of their range.

The master-key, Fig. 9, is cut away so that it avoids the registering apparatus. The key in Fig. 10 is so cut that only one lever will be moved, and that so slightly as to register only No. 1. Figs. 11 and 12 show keys that are cut to register Nos. 1879 and 9999, respectively.

Having thus fully described my invention, what I claim as new, and desire to secure by Letters Patent, is—

1. The combination, with the locking mechanism of a lock, of registering mechanism for registering or indicating any one of a series of differently formed and indicated keys, which operates both the locking and registering mechanism in unlocking the lock, substantially as specified.

2. The combination, with the locking mechanism of a lock, of one or more movable registering-tablets for registering or indicating any one of a series of differently formed and indicated keys, which operates both the locking mechanism and registering tablet or tablets in unlocking the lock, substantially as specified.

3. In an indicator-lock, the combination, with suitable locking mechanism and registering mechanism for registering or indicating any one of a series of differently formed and indicated keys, which operates both the locking and registering mechanism, of means, substantially as described, acting to prevent the withdrawal of a key after a partial revolution thereof without first unlocking the lock and indicating or registering its number, substantially as specified.

4. The combination, with the locking mechanism of a lock, of registering mechanism for registering or indicating any one of a series of differently formed and indicated keys, which operates both the locking and registering mechanism, and means, substantially as described, for securing said registering mechanism in any position to which it may be moved by a key in unlocking the lock, substantially as specified.

5. The combination, with the locking mechanism of a lock, of one or more movable registering-tablets for registering or indicating any one of a series of differently formed and indicated keys, which operates both the locking mechanism and registering tablet or tablets, and means, substantially as described, for securing said registering tablet or tablets in any position moved by a key in unlocking the lock, substantially as specified.

6. The combination, with the locking mechanism of a lock, of a series of registering-tablets for registering or indicating any one of a series of differently formed and indicated keys, which operates both the locking mechanism and registering-tablets, and means, substantially as described, for moving said tablets in parallel position previous to being operated upon by a key in unlocking the lock, substantially as specified.

7. The combination, with the locking mechanism of a lock, of a series of registering-tablets for registering or indicating any one of a series of differently formed and indicated keys, which operates both the locking mechanism and registering-tablets, locking device for securing said tablets in position, and means for throwing said locking device out of engagement with said registering-tablets previous to their being operated upon by a key in unlocking the lock, substantially as specified.

8. In an indicator-lock, the combination, with locking mechanism and registering mechanism adapted to be operated by differently formed and indicated keys, of a master-key adapted to operate the locking mechanism without interfering with or disturbing the registering mechanism, substantially as specified.

9. In an indicator-lock, the combination, with locking mechanism, of registering mechanism adapted to be operated by differently formed and indicated keys, a movable plate for closing the register, a master-key, and mechanism, substantially as described, acting to operate said movable plate to open the register only through the master-key, substantially as and for the purpose specified.

10. In an indicator-lock, the combination of the lever or levers G, one or more registering-tablets, N, ratchet or ratchets O, and the pawl P, substantially as and for the purpose specified.

11. In an indicator-lock, the combination of the lever or levers G, one or more registering-tablets, N, ratchet or ratchets O, pawl P, and movable slide V, substantially as and for the purpose specified.

12. In an indicator-lock, the combination of one or more levers, G, one or more registering-tablets, N, ratchet or ratchets O, pawl P, movable slide V, and revolving ring U, provided with eccentric edge $b^2$, substantially as and for the purpose herein shown and described.

13. In an indicator-lock, the combination of one or more levers, G, one or more registering-tablets, N, and the lever W, substantially as and for the purpose herein shown and described.

14. In an indicator-lock, the combination of one or more levers, G, one or more registering-tablets, N, lever W, and spring or springs M, substantially as and for the purpose herein shown and described.

15. In an indicator-lock, the combination of one or more levers, G, one or more registering-tablets, N, one or more ratchets, O, plates H and I, spring-pawl P, and spring or springs M, substantially as and for the purpose herein shown and described.

16. In an indicator-lock, the combination of the spring-lever S, revolving ring U, having slot $a''$ and eccentric rim or edge $b''$, slide V, spring-pawl P, one or more levers, G, one or more registering-tablets, N, and ratchet or ratchets O, substantially as and for the purpose herein shown and described.

17. In an indicator-lock, the combination of one or more movable registering-tablets, N, sliding plate or cover Q, provided with an aperture, $t'$, and the lock-case provided with aperture W′, substantially as and for the purpose herein shown and described.

18. In an indicator-lock, the combination of one or more movable registering-tablets, N, movable plate or cover Q, and lever R, provided with arm $d''$, substantially as and for the purpose herein shown and described.

19. The combination of the lever R, having arm $d^2$, movable plate or lever Q, spring X′, having shoulder $f''$, and stud Z′ and spring Y′, substantially as and for the purpose described.

20. In a lock, the combination, with a spring-bolt, A, of the movable slide or slides E, lever D, and one or more tumblers, C, substantially as and for the purpose herein shown and described.

21. In a lock, the combination, with a spring-bolt, A, of the slotted tumblers C, having shoulders $k'$, lever D, having boss $d'$, and slides E, for engaging with said tumblers C, substantially as and for the purpose herein shown and described.

In testimony whereof I affix my signature in presence of two witnesses.

HENRY LEWIS RUSSELL.

Witnesses:
DE WITT C. ALLEN,
P. C. DIETERICH.